United States Patent
Staupendahl (10) Patent No.: US 10,224,689 B2
(45) Date of Patent: Mar. 5, 2019

(54) Q-SWITCHED CO2-LASER MATERIAL MACHINING SYSTEM COMPRISING ACOUSTO-OPTIC MODULATORS

(71) Applicant: FEHA Lasertec GmbH, Bitterfeld-Wolfen (DE)

(72) Inventor: Gisbert Staupendahl, Jena (DE)

(73) Assignee: FEHA LASERTEC GMBH (DE)

( * ) Notice: Subject to any disclaimer, the term of this patent is extended or adjusted under 35 U.S.C. 154(b) by 0 days.

(21) Appl. No.: 15/512,607

(22) PCT Filed: Jul. 22, 2015

(86) PCT No.: PCT/IB2015/001649
§ 371 (c)(1),
(2) Date: Mar. 20, 2017

(87) PCT Pub. No.: WO2016/042387
PCT Pub. Date: Mar. 24, 2016

(65) Prior Publication Data
US 2017/0310070 A1      Oct. 26, 2017

(30) Foreign Application Priority Data
Sep. 18, 2014  (DE) .......... 10 2014 013 567

(51) Int. Cl.
*H01S 3/10*        (2006.01)
*H01S 3/117*       (2006.01)
(Continued)

(52) U.S. Cl.
CPC .......... *H01S 3/117* (2013.01); *G02B 27/0966* (2013.01); *H01S 3/005* (2013.01);
(Continued)

(58) Field of Classification Search
CPC ... H01S 3/005; H01S 3/10; H01S 3/11; H01S 3/117; H01S 3/0071; H01S 3/2232; H01S 3/127; H01S 3/0064; G02B 27/0966
(Continued)

(56) References Cited

U.S. PATENT DOCUMENTS 6,031,852 A    2/2000  Thompson
6,970,484 B2 * 11/2005 Paldus ................ H01S 5/141
                                                  372/19
(Continued)

FOREIGN PATENT DOCUMENTS

EP    0674374 A2     9/1995
WO    2013/113306 A8  1/2013
WO    2013113306 A1   8/2013

OTHER PUBLICATIONS

International Report on Patentability dated Mar. 30, 2017, 22 pages.

*Primary Examiner* — William R Alexander
(74) *Attorney, Agent, or Firm* — Stuart H. Mayer; Mayer & Williams (57) ABSTRACT

A Q-switched CO2 laser material processing system with acousto-optic modulators (AOM) is employed, on the one hand, inside the resonator for Q-switching the CO2 laser and, on the other hand, externally for efficient suppression of the radiation feedback between a laser and workpiece. The frequency shift of the radiation diffracted at the AOM is taken into account which exactly corresponds to the excitation frequency of the acoustic wave in the AOM crystal under the aspect of the amplification of the radiation in the active medium. Since this frequency shift significantly reduces the amplification of the radiation, it has to be avoided in the Q-switching process, which is achieved, by means of a tandem of two AOMs with identical excitation frequencies but with the acoustic waves propagating in opposite directions in the crystal. The frequency shift advan-
(Continued)

tageously suppresses radiation feedback between the laser and workpiece.

7 Claims, 10 Drawing Sheets

(51) Int. Cl.
*H01S 3/11* (2006.01)
*H01S 3/127* (2006.01)
*H01S 3/223* (2006.01)
*H01S 3/00* (2006.01)
*G02B 27/09* (2006.01)

(52) U.S. Cl.
CPC .............. *H01S 3/0064* (2013.01); *H01S 3/10* (2013.01); *H01S 3/11* (2013.01); *H01S 3/127* (2013.01); *H01S 3/2232* (2013.01); *H01S 3/0071* (2013.01)

(58) Field of Classification Search
USPC .......................................................... 359/710
See application file for complete search history.

(56) References Cited

U.S. PATENT DOCUMENTS

| | | | |
|---|---|---|---|
| 7,564,880 B2 * | 7/2009 | Muenter | H01S 3/082 372/108 |
| 8,026,158 B2 * | 9/2011 | Bruland | B23K 26/0622 219/121.6 |
| 8,497,450 B2 * | 7/2013 | Bruland | G02B 26/101 219/121.64 |
| 2004/0143248 A1 * | 7/2004 | Marchitlo | A61B 5/411 606/9 |
| 2005/0270631 A1 | 12/2005 | Johnson | |

* cited by examiner

Q-SWITCHED CO2-LASER MATERIAL MACHINING SYSTEM COMPRISING ACOUSTO-OPTIC MODULATORS

FIELD OF THE INVENTION

The invention relates to a Q-switched $CO_2$ laser material processing system with acousto-optic modulators (AOM) for beam shaping.

PRIOR ART AND BACKGROUND OF THE INVENTION

Numerous technologically relevant material processing tasks can very efficiently be solved with $CO_2$ lasers of the most various specific designs. Frequently, theses tasks are however bound to pulsed radiation, e.g., drilling with high quality requirements. But exactly this is a certain weak point of the known commercially available $CO_2$ lasers: their capability of being pulsed is substantially limited by the wavelength range of the radiation in the infrared range at about 10 μm by that there are only a limited number of optically transparent materials that are suitable for modulation, in particular of the Q-switch, at the high mean powers required for material processing by laser. Beside mechanical switches with their known drawbacks, practically exclusively acousto-optic modulators (AOM) based on germanium and electro-optic modulators (EOM) based on CdTe are used for Q-switching of modern $CO_2$ lasers, however with relatively narrow limits with regard to the attainable mean power for the resonator design being common for a long time. One way out of this conflict is demonstrated by the Q-switched $CO_2$ laser system described in WO 2013/113306 A8, which in principle allows mean powers of Q-switched $CO_2$ laser systems up to the kilowatts range.

TECHNICAL OBJECT OF THE INVENTION

It is the object of the invention to provide a $CO_2$ laser material processing system that, on the one hand, is Q-switched by means of acousto-optic modulators (AOM) and, on the other hand, is decoupled extremely efficiently from radiation reflected back from the workpiece by means of another AOM that is arranged externally, that is outside of the laser resonator.

BASICS OF THE INVENTION AND PREFERRED EMBODIMENTS

For achieving this technical object, the invention teaches the subject matter of claim 1. Preferred embodiments are described in the subclaims.

For the purpose of the invention, exclusively the use of AOMs in as powerful as possible Q-switched $CO_2$ laser systems is considered, among other things being suitable for material processing by laser, and herein is also included the externally occurring beam shaping, that is outside of the laser resonator, in particular the isolation of the laser from radiation reflected back from the workpiece. The center of the invention is a factor that normally is neglected, namely the frequency shift of the beam diffracted at the AOM, the reason for this frequency shift being the diffraction at a propagating grating corresponding to the frequency, by which this moving grating is generated. If the diffracted beam is used, which is often reasonable or even necessary for the reasons presented below, this fact has a decisive influence on the effect of the amplifying active medium on the radiation with positive and negative aspects.

For a better understanding of the solution according to the invention, the relationship between the spectral width of the gain profile of the active medium and the influence of the radiation frequency in the diffracted beam of an AOM need to be discussed in more detail. This will be explained in more detail with reference to figures representing examples of execution only, which are referred to in detail in the following.

It is known that in Bragg diffraction at the propagating grating in the AOM the frequency $f_{AOM}$, by means of which this grating is generated by the transducer, is additively or subtractively imposed on the frequency f of the light wave incident on the AOM, depending on the direction of propagation of the grating, so that for the resulting frequency $f_B$ of the diffracted wave applies: $f_B = f \pm f_{AOM}$.

Now, how will this frequency-shifted wave interact with the active medium, i.e., how will the shift affect the gain? In the $CO_2$ laser, there are mainly two line broadening mechanisms that determine the gain profile $g(f-f_0)$, the Doppler broadening and the pressure broadening.

Figure 1:
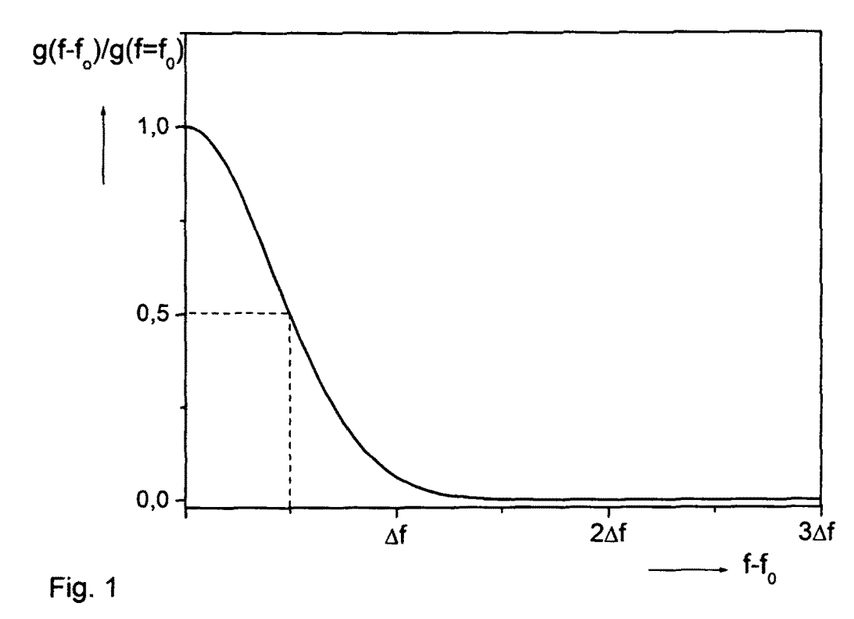
FIG. 1: relative gain as a function of the frequency shift for a Gauss profile.

Doppler broadening as an inhomogeneous line broadening will result, for the gain profile $g(f-f_0)$, in a Gauss profile according to the function $$g(f-f_0)_G = (\pi \ln 2)^{\frac{1}{2}} \frac{2}{\Delta f} \exp\left[-\left(\frac{f-f0}{\Delta f/2}\right)^2 \ln 2\right]$$

with the resonance frequency $f_0$ and the full-width at half-maximum $\Delta f$. FIG. 1 illustrates, how the gain decreases relative to the maximum value at $f=f_0$ with increasing frequency shift compared to the resonance frequency. If $f_{AOM}$ and $\Delta f$ reach an identical order of magnitude, this fact will become decisively important for the function of the laser system.

Pressure broadening as a homogeneous line broadening will result, for the gain profile $g(f-f_0)$, in a Lorentz profile according to the function $$g(f-f_0)_L = \frac{1}{\pi} \frac{\Delta f/2}{(f-f0)^2 + (\Delta f/2)^2}$$

Figure 2:
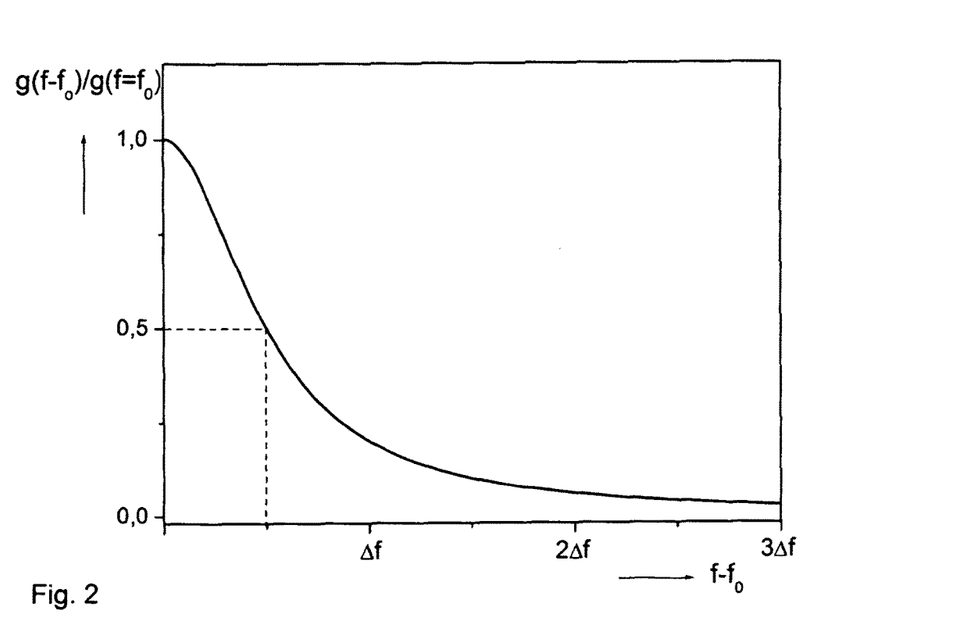
FIG. 2: relative gain as a function of the frequency shift for a Lorentz profile.

As is shown in FIG. 2, the gain decrease exhibits here a very similar behavior as for Doppler broadening, when again $f_{AOM}$ and $\Delta f$ are in the identical order of magnitude. It should be noted here that for low-pressure $CO_2$ lasers up to about 30 mbar, Doppler broadening is dominant, for medium and high-pressure lasers above 100 mbar, pressure broadening playing an increasing role. In any case, it can however be assumed that at the typical AOM frequencies in the range of 40 MHz and more the resulting frequency shift of the diffracted radiation beam significantly reduces the amplification of this beam in the active medium. A simple consideration will illustrate this.

When assuming a loss-free amplification in an active medium of length z, with entry of a power $P_0$ into the medium with the gain g, in the case of small-signal gain, the power P(g) at the output can be calculated according to:

$$P(g) = P_0 \exp(gz)$$

Figure 3:
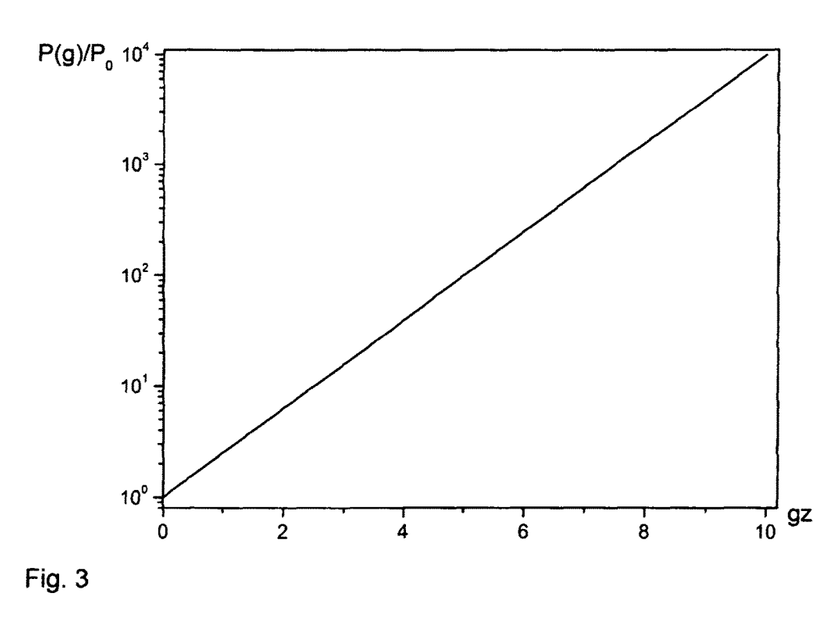
FIG. 3: relative amplification in the active medium as a function of gz.

The relative amplification $P(g)/P_0$ is shown in FIG. 3 as a function of the product gz. Since in high-power $CO_2$ lasers the small-signal gain is typically in the range from $10^4$ to $10^6$, it can immediately be read that already relatively small reductions in gz (z taken as constant) by, for example, a factor 2 from 10 to 5 will lead to a decrease of the amplification by two orders of magnitude from $10^4$ to $10^2$. Such a decrease of g by a factor 2 results however already at frequency shifts of the radiation of the resonance frequency $f_0$ interacting with the active medium by $\Delta f/2$ (cf. FIGS. 1 and 2).

In the case of typical low-pressure $CO_2$ lasers, the Doppler broadening and thus $\Delta f$ of the gain profile is about 60 MHz, i.e., a frequency shift by 30 MHz (the common frequency working ranges of AOMs are at 40 MHz and more) reduces g by a factor 2 already and thus the small-signal gain of the active medium by a factor of about 100.

In the following, the importance for the utilization of AOMs in a $CO_2$ laser material processing system is explained. Following the object of the invention, two cases with completely different requirements have to be distinguished. For illustration, reference is made to FIGS. 5 and 9.

1. Using AOMs for Q-Switching the $CO_2$ Laser

Figure 4:
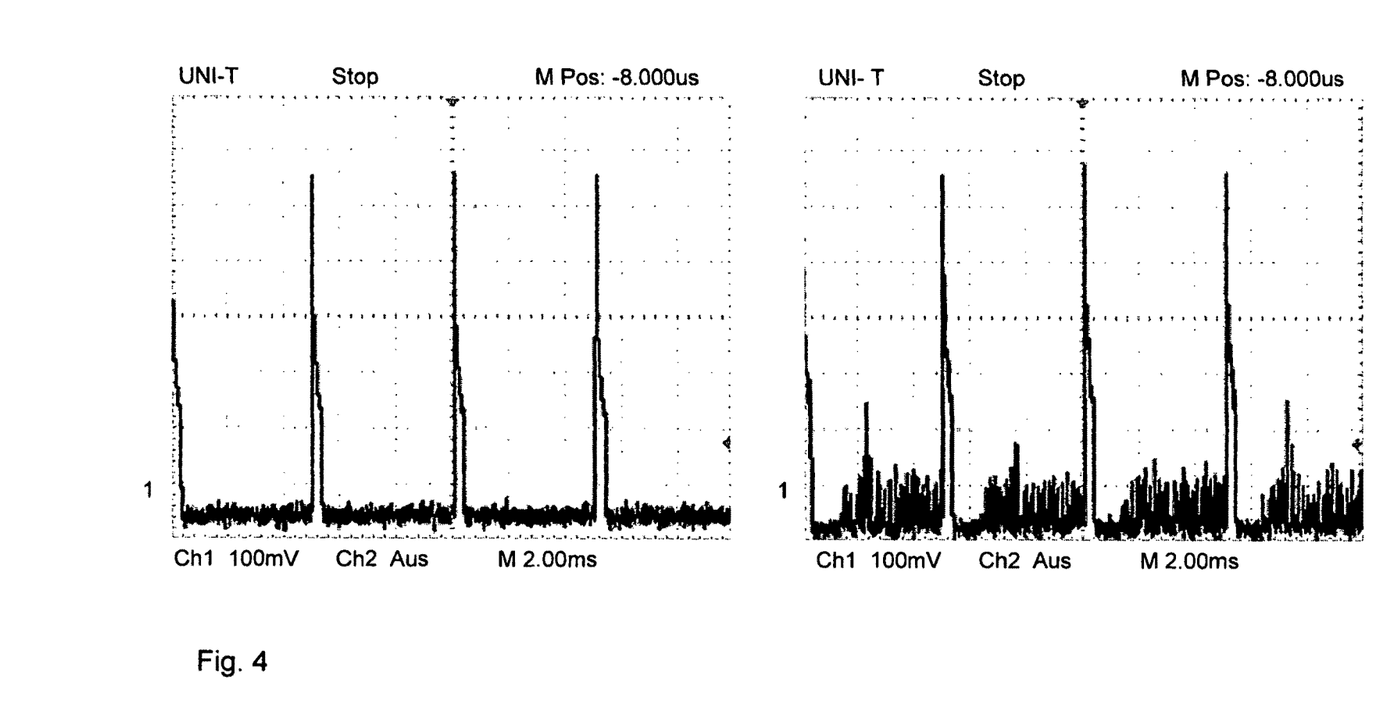
FIG. 4: radiation feedback workpiece-laser: left-hand without, right-hand with workpiece.

In general, the simplest variant is used, in which the AOM for Q-switching is arranged between the active medium and a resonator end mirror, and the undiffracted, transmitted beam is fed back. It will however fail, when firstly, the diffraction efficiency of the AOM is not sufficiently high, and/or secondly, the gain of the active medium is so high that a complete suppression of the laser function in the desired pulse pauses by activation of the AOM, i.e., involvement of high diffraction losses, becomes impossible. This situation is quickly obtained, considering the huge small-signal gains mentioned above, which will occur with continuous pumping of the active medium after a few 10 μs already, when no reduction of inversion occurs. The consequence thereof is the occurrence of statistical radiation peaks in the actual pulse pause (cf. FIG. 4), and controlled Q-switching is not possible.

In order to make the contrast ratio "On"-"Off" of the feedback branch practically infinitely high, it is immediately obvious to use the diffracted beam of the AOM for feedback, since it completely vanishes with deactivation of the AOM, a parasitic oscillation of the laser is reliably suppressed, even with very high occupation inversions. This apparently simple solution presents a big problem, however, namely the frequency shift discussed above of the diffracted beam! If a diffraction at a propagating grating is assumed, as a typical example, which is generated with 40 MHz, the radiation frequency will shift by exactly these 40 MHz in one diffraction process. Since the grating is passed twice in the same sense, in case of feedback, a frequency shift of even 80 MHz will result. The Doppler width of the gain profile of a low-pressure $CO_2$ laser is however only approx. 60 MHz, i.e., the radiation diffracted and returning back into the active medium comes upon a very low gain (see FIG. 1) and is therefore only very little amplified (see FIG. 3), and an efficient laser function is not possible. The solution according to the invention of this problem consists in the utilization of an AOM tandem, i.e., a first AOM divides the incident beam into a transmitted and diffracted portion, a second AOM provided immediately behind is arranged such that firstly, the diffracted portion comes upon the optimum Bragg angle again and is diffracted a second time, and secondly, the effective direction of the grating propagating at the two AOMs is exactly opposite, so that the effective frequency shift of the above-mentioned example is once +40 MHz and once −40 MHz, that is, the sum is 0. The returning beam comes upon analogous relationships and the fed-back beam that experiences in total four diffractions, re-enters the active medium with a frequency shift 0, comes upon an optimum gain, and a normal laser function is possible.

This principle is even working, when for simplification of the control process, one only AOM modulates the power, and the second AOM operates continuously, i.e., the latter serves practically only for compensation of the frequency shift of the first AOM, by means of which the actual Q-switching is performed. The use of an AOM tandem according to the invention thus secures, firstly, a complete suppression of parasitic feedbacks in the laser and, secondly, a completely free controllability of the pulse parameters in the AOM switching times.

2. Using AOMs for Highly Efficient Suppression of the Radiation Feedback Workpiece-laser A second critical point for a Q-switched $CO_2$ laser is in any case the radiation feedback from the workpiece into the laser. This may reach, mainly at highly reflecting materials such as copper or aluminum and at plane workpiece surfaces, enormous levels that may be far higher than 10% of the radiation power incident on the workpiece. The common method for the solution of problems caused thereby, i.e., the realization of a proper laser function with a "laser-like" design of a wave front determined by the chosen resonator configuration, is the integration of a combination of an ATFR mirror ("Absorbing Thin Film Reflector") and a λ/4 phase shifter mirror in the optical path between laser output and workpiece. This even has a double function, since beside the radiation decoupling, the frequently desired circular polarization of the radiation incident on the workpiece is generated. This form of decoupling is completely sufficient, e.g., in the cw-mode of the laser, in which the inversion is continuously reduced and held on a relatively low level. If, however, Q-switching is employed, occupation inversion and thus gain will increase in the pulse pauses by orders of magnitude, the small-signal gain will reach the levels mentioned above, and even smallest fed-back amounts of radiation will suffice to lead to parasitic oscillations of the laser and sensitively impair the Q-switching process. Here, the mentioned system fails, since even at optimum adjustment, certain radiation portions definitely in the percent range of the radiation traveling to the workpiece will return back into the laser. The consequences are shown, e.g., in FIG. 4: Whereas the left-hand picture shows a proper pulse generation of the Q-switched laser without workpiece, that is without radiation feedback, when providing a workpiece, that is with a more or less important radiation feedback, the situation shown in the right-hand picture will occur, namely that after the Q-switching pulse and a certain pause, in which the inversion builds up to the critical level, parasitic oscillations will start, which make the desired laser function impossible.

The solution according to the invention of this problem is again based on the frequency shift of the diffracted beam in an AOM. This time, this effect is used for a positive result in the following way. Immediately behind the laser output, an AOM is arranged such that the linearly polarized radiation is diffracted in an optimum manner. This diffracted radiation portion that again exhibits the mentioned frequency shift, is sent to the workpiece for processing. It is noted that frequency shifts of the order of magnitude relevant here themselves do not have any effects on material processing. Returning radiation portions (reflected or diffracted) hit a second time on the AOM, and the frequency shift is doubled. When now this frequency-modified beam enters the active medium, its effect on the occupation inversion is virtually zero, since it is practically not amplified. Specifically, this means, with the above-mentioned parameters $f_{AOM}=40$ MHz and $\Delta f=60$ MHz that the radiation returning into the resonator is amplified in a degree by more than 4 orders of magnitude smaller than resonant radiation of frequency $f_0$. For illustration of the enormous difference to classical decoupling, we again consider the amplified power P(g):

$$P(g) = P_0 \times \exp(gz)$$
$$\downarrow \quad\quad \downarrow$$
$$\text{"ATFR} + \lambda/4\text{"} \quad \text{"AOM"}$$

In the decoupling variant "ATFR+λ/4 phase shifter", the parameter $P_0$ is affected, and in proportion to the change of $P_0$, P(g), too. In contrast, in the solution according to the invention, the changes in g are taken into account in the exponential function, so that comparatively small reductions in g will already account for several orders of magnitude in the amplification.

BRIEF DESCRIPTION OF THE DRAWINGS

The specifics of the AOM use in a $CO_2$ laser material processing system according to the invention will now be explained in more detail with reference to two embodiments that are schematically shown in the following drawing. There are.

DETAILED DESCRIPTION OF THE INVENTION

Figure 5:
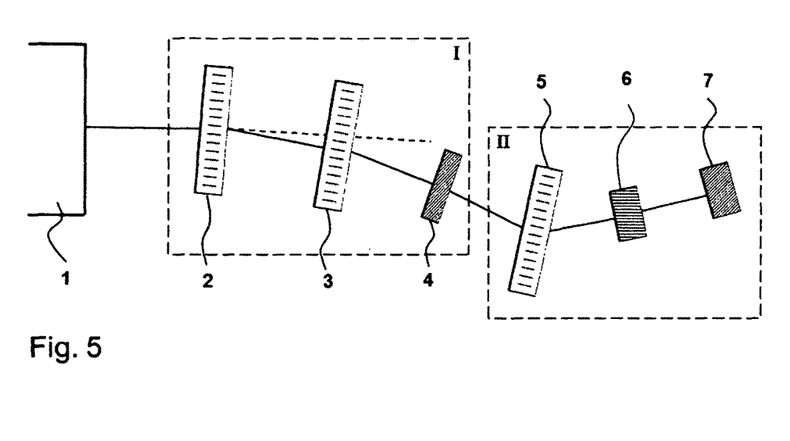
FIG. 5: $CO_2$ laser with AOM Q-switch.

FIG. 5 shows schematically a first embodiment based on the basic structure of a common Q-switched $CO_2$ laser, for which a linear arrangement of the resonator "100-% end mirror-active medium-element for Q-switching-output coupler plate" is typical. The representation shows the unit for feedback I arranged at one end of the active medium, and the following very schematically shown unit II shows the optical path from laser to workpiece. As mentioned above, there are two problems when using an AOM as an element for Q-switching. Either the simply transmitted beam is fed back, that is the $0^{th}$ order. Then, with a high-power laser, it will not be possible to suppress the laser function at maximum occupation inversion, since the diffraction efficiency of common AOMs for $CO_2$ lasers is higher than 90%, and thus the maximum introduced losses are not high enough. Or the diffracted beam, that is the $1^{st}$ diffraction order, is fed back with the problem of frequency shift and the thus drastically reduced gain.

Figure 6:
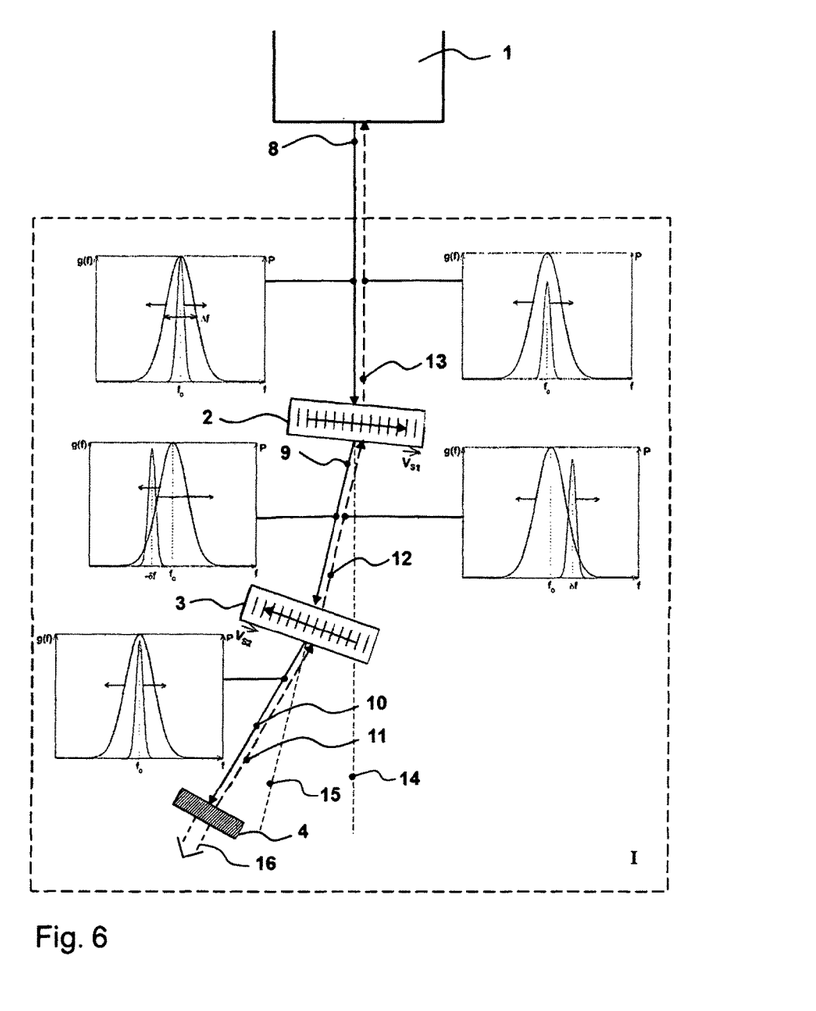
FIG. 6: function of an AOM tandem for Q-switching.

The problem is solved, according to the invention, by the tandem arrangement of two AOMs as Q-switching elements shown in FIG. 5 and explained in more detail in FIG. 6. Beam 8 coming from the direction of the active medium 1 hits on a first AOM 2 deflecting this beam into the $1^{st}$ Bragg diffraction order when a corresponding switching voltage is applied. This beam 9 hits on a second AOM 3 generating therefrom the diffracted beam 10 when the switching voltage is applied. After a partial reflection at the adjusted output coupler plate, the beam travels back precisely in itself (beams 11, 12, and 13) and provides for the feedback that is required for the laser function. Decisive for the proper function of this AOM tandem are two factors: Firstly, both AOMs must have the exactly identical excitation frequency for the diffraction grating and secondly, the directions of propagation of both gratings have to be opposite to each other. The term of the exactly identical excitation frequency designates in particular frequencies, whose difference is maximum 100 ppm (referred to the higher frequency), in particular maximum 10 ppm, preferably maximum 1 ppm, or 0.1 ppm. Then, the resulting frequency shift of the fed-back beam is 0, as required. The respective back and forth shifts of the frequencies by δf and the successive decrease of the power P of beams 8-13 by the diffraction at the AOMs are illustrated in the respective representations of the qualitative dependencies g(f) and P as a function of f.

As set forth further above, there is another latent risk of the proper Q-switching operation of the $CO_2$ laser in question in the feedback of radiation from workpiece to be processed into the laser. For an extraordinarily efficient suppression thereof, there is arranged, according to the invention, a third AOM 5 immediately behind the laser output coupler plate 4. In the optical path to the workpiece, optionally a unit 6 for further beam shaping may also be integrated, in particular for generating the circular polarization desired for many applications of the radiation on the workpiece 7 and for compensation (e.g., by means of cylindrical lenses) of the slightly elliptic distortion of the beam frequently typical for AOM.

Figure 7:
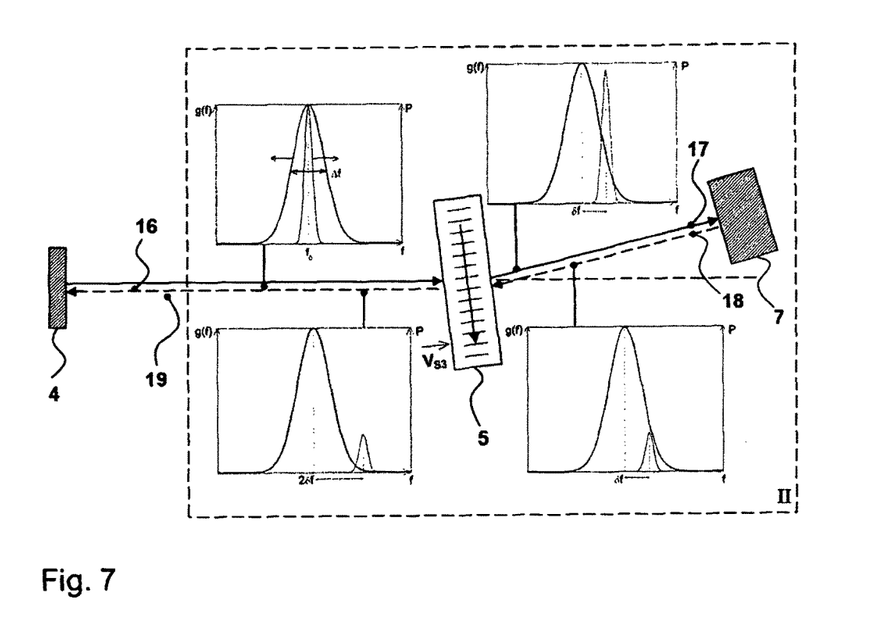
FIG. 7: suppression of the radiation feedback workpiece-laser by means of AOM.
Figure 8:
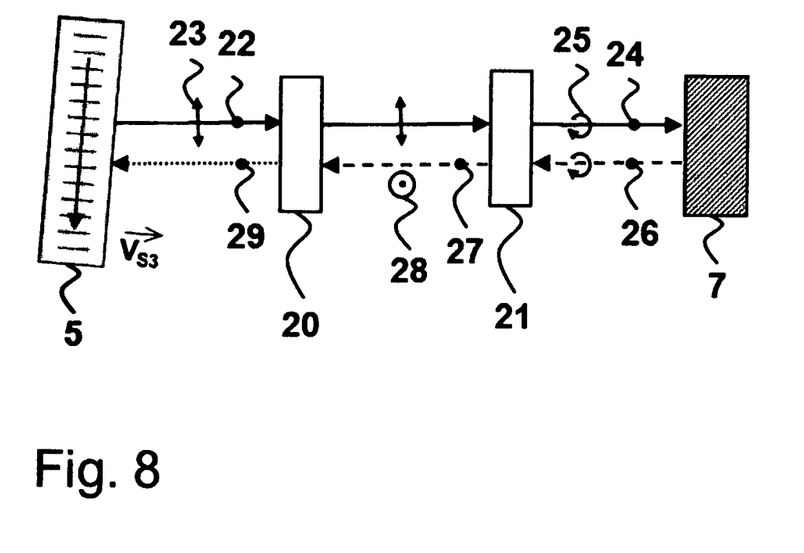
FIG. 8: complete decoupling by means of AOM, ATFR, and λ/4 phase shifter.

FIGS. 7 and 8 illustrate the suppression of the radiation feedback once again in detail. FIG. 7 concentrates on the effect of the frequency shift according to the invention. The coupled-out beam 16 hits on the third AOM 5, which sends the beam 17 diffracted and frequency-shifted by δf to the workpiece, when the switching voltage is applied. The radiation 18 returning therefrom (reflected or diffracted) is diffracted a second time in the AOM 5 and experiences a second frequency shift, so that ultimately the beam 19 frequency-shifted by 2δf travels in the direction to the output coupler plate of the laser. In an analogous manner to FIG. 5, the qualitative dependencies g(f) and P as a function of f are also presented in FIG. 6. According to the invention, the AOM 5 has to be selected such that the doubled frequency shift 2δf is at least in the order of the full-width at half-maximum Δf of the gain profile. The term "order of magnitude" means that the ratio 2δf/Δf should preferably be in the range from 1:10 to 100:1, in particular from 1:1 and/or to 10:1.

An essential factor of the arrangement according to the invention is the fact that the common conversion of the linearly polarized radiation of the laser into circularly polarized radiation by a λ/4 phase shifter arranged behind AOM 5 is possible without problems. Equally it is possible to introduce the classical decoupling exceeding this by a combination "ATFR mirror-λ/4 phase shifter" in addition into the optical path. Such a "complete version" is illustrated in FIG. 8. The beam 22 diffracted by the third AOM 5 with vertical linear polarization 23 passes through the polarization-dependent absorber 20 (in the practice ATFR) virtually loss-free and is then transformed in the λ/4 phase shifter 21 into the beam 24 with circular polarization 25. After interaction with the workpiece 7, a certain portion 26 of this circularly polarized radiation travels back into the direction of the laser. When passing the λ/4 phase shifter 21, it is transformed into a beam 27 with linearly horizontal polarization 28, which is substantially destroyed by interaction with the polarization-dependent absorber. A remaining beam 29 now already very strongly weakened will then hit again on the AOM 5, and as a consequence of the loss processes summarized again below for the returning beam to be destroyed, an extremely good decoupling of the laser of this radiation is achieved:

1. As mentioned above, the AOM 5 shifts the frequency of the diffracted beam by δf, thus that of radiation returning from workpiece by 2δf. Which was disadvantageous for the Q-switching AOM, is here a huge advantage—the radiation returning into the laser is amplified to a minimum degree only.
2. The decoupling effect of the combination "ATFR mirror-λ/4 phase shifter" is fully maintained.
3. A third decoupling effect is achieved by that the returning radiation is polarized by the phase shifter vertically to forward radiation and is therefore only ineffectively diffracted by the AOM 5, i.e., less radiation travels in the direction of the laser.

The combination of these three effects that act purely stationarily and do not require any particular temporal control of the AOM 5, leads to that the arrangement according to the invention weakens the returning radiation by many orders of magnitude, so that even at maximum gain in the active medium and at maximum feedback (e.g., by highly reflecting metals such as copper) no parasitic oscillations will occur.

Irrespective of this system-immanent decoupling according to the invention, furthermore, the AOM function as a quick-action switch with switching times shorter than 1 μs can of course fully be used, i.e., with corresponding control, practically each individual pulse coming from the laser can be influenced, as desired.

In the above embodiment, the two AOMs for Q-switching are directly exposed to the resonator-internal radiation field with its always present power increase compared to the coupled-out laser power. Such laser systems are limited, due to the relatively low radiation loadability of germanium, to mean output powers of a few hundred watts. As noted above, the principle of the laser according to WO 2013/113306 A8 provides for a way out this dilemma and enables mean output powers up to the kilowatts range. The problems described in the above patent fully apply, however, still for this type of laser, and in order to be able to fully benefit from the possibilities thereof, the solutions according to the invention are particularly helpful.

Figure 9:
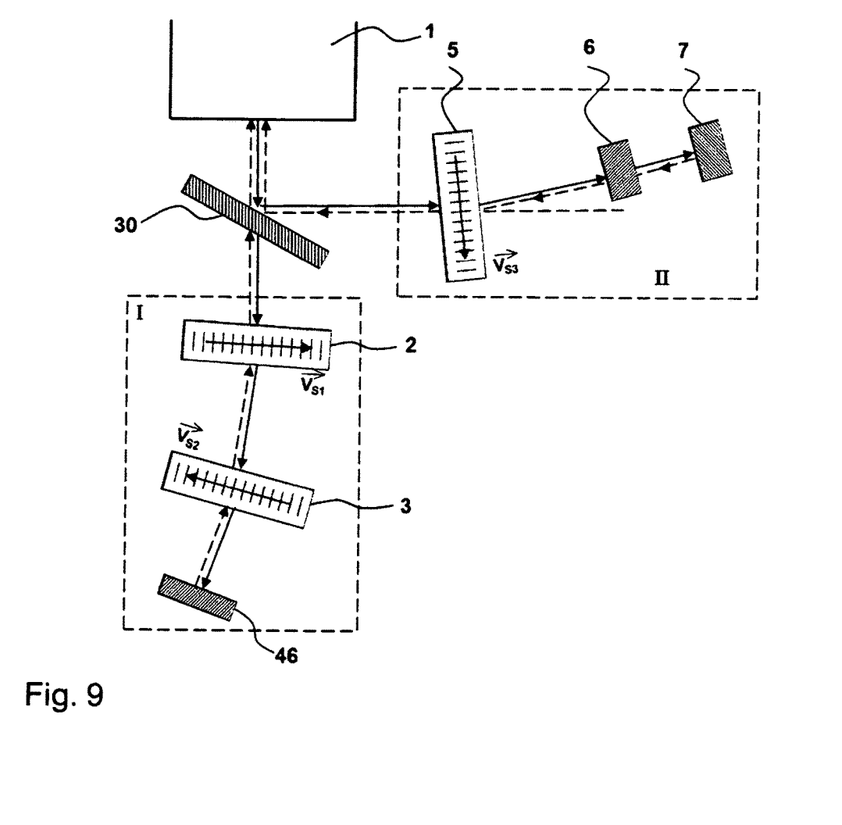
FIG. 9: AOM use in a $CO_2$ laser according to patent document WO 2013/113306 A8.

This situation will briefly be discussed in a second embodiment. FIG. 9 shows the basic difference to the first embodiment. It mainly consists here of the modified output coupling of the laser beam via a thin-film polarizer (TFP) 30. The TFP 30 divides the slightly elliptically polarized radiation coming from the active medium into a high-power beam polarized vertically to the plane of the drawing that is coupled-out, and a relatively weak beam polarized in the plane of the drawing that is fed-back. Thereby, the radiation load of the AOM tandem 2, 3 responsible for the Q-switch is relatively low, even at comparatively high output powers. The effects of the units I and II are apart from that identical, as described above. Only the output coupler plate 4 is here replaced by a 100-% end mirror 46. It has to be noted, in this representation, that due to the polarization dependence of the AOM function, the third AOM 5 has actually to be rotated by 90° about the beam axis, this is not shown in FIG. 9 for reasons of clarity.

Figure 10:
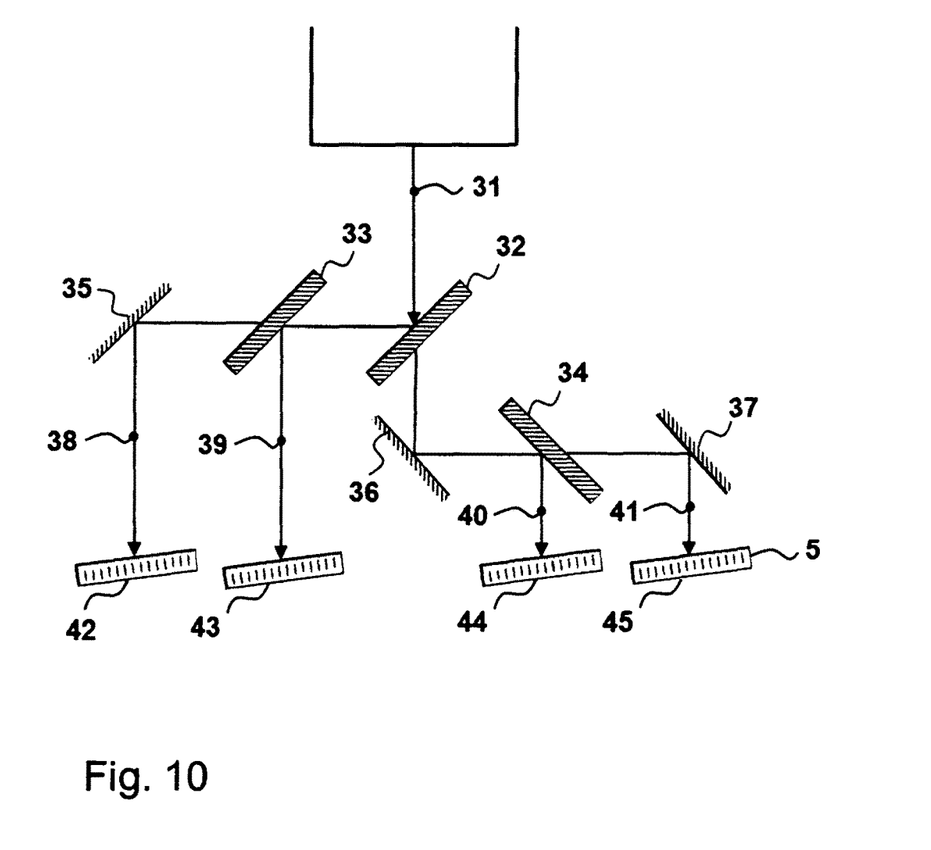
FIG. 10: example of suppression of the radiation feedback workpiece-laser by means of AOM with 4 partial beams.

With respect to this second embodiment, another aspect is discussed. As mentioned above, the laser according to FIG. 9 typically is characterized by relatively high mean powers. If now the external AOM 5 is positioned immediately at the laser output, the usable mean power would be sensitively limited by the relatively low radiation loadability of the germanium crystal, and the benefits of the laser could not fully be exploited. Here, a variant often employed in the practice can be utilized, in order to work with high-power lasers as efficiently as possible—the defined beam splitting. Beam splitters based on ZnSe can be employed up to the kilowatts range and are thus suitable, for example, to split a beam of the mean power 1.2 kilowatts by a splitter cascade into 4 partial beams of 300 watts each, which can easily be handled by an AOM (cf. FIG. 10). For this are necessary, e.g., in the variant shown in FIG. 10, three beam splitters 32, 33, and 34, preferably with a splitter ratio of 50:50 each, and three deflection mirrors 35, 36, and 37. Each partial beam 38 to 41 then receives its own AOM 42 to 45. The condition for using this method is, of course, that the respectively intended application can be performed with the partial beams.

The invention claimed is:

1. A Q-switched CO2 laser material processing system, comprising acousto-optic modulators (AOM) for beam shaping, wherein
   a) for the Q-switch two AOMs arranged behind each other and preferably close to a resonator end mirror or a laser output coupler plate, said AOMs being characterized by identical excitation frequencies and opposite directions of propagation of the acoustic wave in the crystal, are arranged with the proviso that a beam incident on the first AOM is diffracted, a diffracted beam resulting therefrom is once again diffracted at the second AOM, and this beam resulting from the dual diffraction, after reflection at the resonator end mirror or the laser output coupler plate, is reflected back in itself and is fed back as a beam after another diffraction at the two AOMs into an active medium, and thus a laser function is realized, when a corresponding switching voltage is applied to the two AOMs, and when turning-off this voltage the laser function is interrupted, and
   b) a thus produced laser beam coupled-out by means of an output coupling element prior to use, for material processing by laser, is sent through a third AOM arranged outside of the resonator and preferably immediately behind the output coupling element, wherein for the intended use the beam diffracted by means of a corresponding switching voltage at the third AOM is employed, and the excitation frequency of the acoustic wave in the crystal of this third AOM is at least in the order of the frequency full-width at half-maximum of the gain profile of the active medium, and between 40 and 100 MHz,
   wherein the laser material processing system is decoupled from radiation reflected back from a workpiece placed into the laser material processing system.

2. The Q-switched CO2 laser material processing system according to claim 1, wherein only the first or the second AOM is used for power modulation or Q-switching of the laser by corresponding variable control of the switching voltage, and the respectively other AOM operates with a constant switching voltage.

3. The Q-switched CO2laser material processing system according to claim 1, wherein the first or the second AOM is used for Q-switching of the laser by variable control of the switching voltage, and the respectively other AOM is controlled such that freely selectably individual pulses or pulse groups are selected and/or the power of the Q-switched radiation is varied.

4. The Q-switched CO2 laser material processing system according to claim 1, wherein the external third AOM is controlled such that the radiation pulses generated by the laser are adjusted in their power to the respective intended use, and in particular the power profile within the pulses, particularly the peak power of the Q-switching peak, is substantially freely selectable.

5. The Q-switched CO2 laser material processing system according to claim 1, wherein between the third AOM and the workpiece, a combination of ATFR mirror and $\lambda/4$ phase shifter is arranged.

6. The Q-switched CO2 laser material processing system according to claim 1, wherein between the third AOM and the workpiece in the beam shaping unit, optical elements, preferably cylindrical lenses, for compensation of the beam deformations caused by the AOM are arranged.

7. The Q-switched CO2 laser material processing system according to claim 1, wherein the external third AOM is replaced by an AOM cascade of two or more AOMs, and the coupled-out laser beam is divided by beam splitters and deflection mirrors into two or more partial beams such that each AOM is loaded with one of the partial beams.

* * * * *